United States Patent [19]

Seegers

[11] Patent Number: 4,817,501

[45] Date of Patent: Apr. 4, 1989

[54] MULTIPLE-CIRCUIT VALVE APPARATUS

[75] Inventor: Gunter Seegers, Barsinghausen, Fed. Rep. of Germany

[73] Assignee: WABCO Westinghouse Fahrzeugbremsen GmbH, Hanover, Fed. Rep. of Germany

[21] Appl. No.: 109,871

[22] Filed: Oct. 19, 1987

Related U.S. Application Data

[62] Division of Ser. No. 773,898, Sep. 9, 1985.

[30] Foreign Application Priority Data

Sep. 22, 1984 [DE] Fed. Rep. of Germany ....... 3434884

[51] Int. Cl.[4] .......................... F15B 11/08; F15B 13/04
[52] U.S. Cl. .......................................... 91/446; 91/448; 91/510; 91/532; 91/516
[58] Field of Search .......................... 91/28, 29, 31, 446, 91/447, 448, 509, 510, 532, 516; 60/581, 586, 587; 137/110, 118

[56] References Cited

U.S. PATENT DOCUMENTS

| 4,037,617 | 7/1977 | Perales | 137/118 |
| 4,054,327 | 10/1977 | Rebenstorf | 137/118 X |
| 4,057,298 | 11/1977 | Seegers | 303/84 R |

Primary Examiner—Robert E. Garrett
Assistant Examiner—Mark A. Williamson
Attorney, Agent, or Firm—J. O. Ray, Jr.

[57] ABSTRACT

A bidirectional flow communication passageway is provided by the present invention in a multiple-circuit fluid pressure responsive system on a motor vehicle to allow a gradual reduction of pressure in a parking brake circuit which is a part of such system. The passageway is restricted to limit such bidirectional flow to a predetermined level. The pressure reduction permitted is sufficient to activate a parking brake valve in such parking brake circuit when a defect occurs in an operating service brake circuit which is also a part of such system.

10 Claims, 4 Drawing Sheets

MULTIPLE-CIRCUIT VALVE APPARATUS

This is a divisional of copending application Ser. No. 773,898, filed on Sept. 9, 1985.

BACKGROUND OF THE INVENTION

The present invention relates, in general, to a fluid pressure responsive multiple-circuit system for use on a motor vehicle, which system includes at least one operating service brake circuit and a parking brake circuit. More particularly, the invention relates to a method of and apparatus for automatically controlling the parking brake circuit should a defect occur in the operating service brake circuit.

Presently known fluid pressure responsive multiple-circuit systems for use on motor vehicles, and particularly trucks, typically comprise a plurality of service brake circuits, a parking brake circuit, and usually at least one auxiliary circuit for various accessories of the system. The parking brakes on these vehicles are usually spring-applied and released by an application of fluid pressure sufficient to overcome the spring loading. In these systems, which usually operate with pneumatic pressure, safety or overflow valve devices have been used to control the charging of the several circuits from a common fluid pressure source. Each of such circuits may be charged through a respective safety valve in a certain desired order such that, when charging, fluid pressure is supplied to the auxiliary circuits only after the service brake circuits have been charged. This priority charging of the circuits then ensures that the vehicle may be set in motion only after the pressure has been adequately built up in at least one of the service brake circuits and in the parking brake circuit at least sufficient to release the spring-loaded cylinders applying the parking brakes.

Overflow valves are customarily designed to open when a sufficiently high pressure has built up on their inflow side; this is known as the valves's opening pressure. For a number of reasons, this opening pressure is, as a rule, not constant for any particular overflow valve. One of the primary reasons for this is because initially the pressure on the outflow side of the overflow valve is lower than the pressure on the inflow side; and, in the normal case, the opening pressure required will decrease with an increasing pressure on the outflow side.

This effect is related to such customary design of an overflow valve. In this design, a valve element, such as, a valve piston, is pressurized in the closing direction by an adjusting force, for example, a spring; and in the opening direction both by the pressure on the inflow side and, in addition, by the pressure on the outflow side of the valve. At higher pressures on the outflow side of the valve, a lower opening pressure is required to initially open the overflow valve, and vice-versa. Consequently, the opening pressure is at its highest if only atmospheric pressure prevails on the outflow side (or in a more theoretical case, a less than atmospheric or even a negative pressure). The opening pressure, therefore, lies within an opening pressure range.

Once the respective consumer circuit overflow valve is opened, then, except for any flow losses which may occur over the cross-section of the valve, there is essentially an equalization of pressure between the inflow side and the outflow side of the overflow valve, i.e., in the present case, between the supply chamber and the associated consumer circuit, or the operating brake circuit and another consumer circuit, such as, the parking brake circuit.

If, when the overflow valve is open, the essentially identical pressure in the supply chamber and the associated consumer circuit cannot be maintained, for example, because of a leak in that particular consumer circuit, then this pressure will drop. If the pressure drops to a predetermined value, which value is the closing pressure for the particular overflow valve, then the overflow valve closes and cuts off the consumer circuit associated with that particular overflow valve from the supply chamber. Thereafter, the pressure in that consumer circuit can fall further; while in the supply chamber, the closing pressure is maintained without any recharging by the compressed air system. In the case of a recharging by the compressed air system, the air pressure in the supply chamber rises again until it reaches the nominal pressure established for the compressed air installation.

If the essentially identical pressure in the supply chamber and the consumer circuit cannot be maintained on the inflow side as the result of a leak in the vicinity of the supply chamber, for example, at the inflow supply chamber, the overflow valve acts accordingly, i.e., after its closing, the pressure in the supply chamber can drop further while the pressure in the consumer circuit—assuming there is no air consumption—remains at the level of the closing pressure.

The closing pressure—like the opening pressure—is measured on the inflow side, i.e., in the supply chamber. As a result of the customary design of an overflow valve, as described above, its closing pressure is always below its opening pressure range, whereby the difference between the maximum opening pressure and the closing pressure is essentially determined by the ratio of the surface areas on the inflow side and the outflow side of the control element for a particular overflow valve.

This opening and closing behavior of an overflow valve, described above, is put to use in protection systems of the types described above for a mutual protection of the individual consumer circuits.

For an understanding of one of the disadvantages of such prior art systems, assume that the overflow valves of all the consumer circuits are opened, and that essentially there exists a pressure equalization between the supply chamber and each of the consumer circuits. Next, assume that, in one or more of the consumer circuits, there occurs, for some reason, an undesirable outflow of compressed air into the atmosphere, which is large enough to cause a drop in pressure in the supply chamber. This pressure drop is then propagated by the open overflow valves in all the consumer circuits.

Such pressure loss can be caused by a leak, in which case, the consumer circuit in question is actually defective, or by a minor lack of sealing in one or more of the connections required for the consumer circuit in question. These causes of the loss of pressure will be described below by the terms "defect" or "leak".

It is apparent that to cause a drop in the pressure, the leak must be large enough that all of the flow being supplied by the compressed air installation escapes. In other words: when the flow equals zero, or when there are small flows, even small leaks are sufficient; and with larger flows, correspondingly larger leaks are necessary.

This drop in pressure continues in the defective consumer circuit, or possibly circuits, until the closing pressure of the overflow valve or valves associated with the defective consumer circuit or circuits is reached. Then these overflow valves close and cut off the defective consumer circuit or circuits from the supply chamber. In this manner, the pressure loss in the supply chamber and in the other consumer circuits—if their overflow valves are still open—comes to an end. If one or more of the other overflow valves, for example, because of manufacturing tolerances has a higher closing pressure, then this valve or these valves will have already closed and the corresponding consumer circuit will have been cut off from the supply chamber and the pressure drop ceases in the defective consumer circuit or circuits.

In the case of a defect in at least one consumer circuit, therefore, the other consumer circuits are protected by at least the value of the closing pressure of the overflow valve corresponding to the defective circuit. This closing pressure can, therefore, be called the "protected pressure".

If the compressed air system now supplies air, then the pressure in the intact consumer circuits will increase to the opening pressure of the overflow valve of the defective consumer circuit. This is its maximum opening pressure, if the pressure in the defective consumer circuit has already dropped to atmospheric pressure.

Protection systems, as described above, therefore, make certain that in the case of a defect in one or more consumer circuits, the other (intact) consumer circuits, except for a temporary drop in pressure to the "protected pressure", remain fully-operable up to the specified opening pressure.

But, for example, because of the above-mentioned manufacturing tolerances, each of the overflow valves in a protection system in corresponding consumer circuits can have different opening pressures. Such varying opening pressures of these overflow valves can cause problems in certain cases. A typical case of this sort exists if all the consumer circuits exhibit atmospheric pressure if a consumer circuit is defective, and if the overflow valve corresponding to this defective circuit exhibits the lowest opening pressure. Then, if the defect is large and pneumatic pressure is being supplied by the compressed air installation, it can happen that the entire flow will flow through the overflow valve of the defective consumer circuit into the defective circuit. In this situation, the compressed air flows out through the leak into the atmosphere without the other overflow valves of their respective consumer circuits opening. Therefore, these circuits do not become operable. The reason for this is that they do not experience an increase in pressure.

One system developed to overcome this problem is taught in my U.S. Pat. No. 4,057,298, the teaching of which is incorporated herein by reference. In this system, the supply chamber is connected with a consumer circuit parallel to its overflow valve by a throttle channel which includes a check valve disposed therein which cuts off the air flow from the consumer circuit to the supply chamber. The throttle channel is thereby designed so that, if the consumer circuit is defective, the quantity of air flowing through it into the consumer circuit does not suffice to significantly overcome (or to overcome at all) the atmospheric pressure prevailing in the defective consumer circuit and to endanger the operating safety of the remaining intact consumer circuits. In the intact circuits, on the other hand, because of the quantity of air flowing through the throttle channel, a pressure builds up in such intact circuits which is sufficient to lower the opening pressure of the overflow valve to a point where it will open with some degree of certainty. The task of the above-mentioned check valve is to prevent any pressure loss of an intact circuit via the throttle channel and from the supply chamber into a defective consumer circuit.

On an overflow valve which—like the one described above can be bypassed by a throttle channel, the reduced opening pressure, which is set with a consumer circuit initially emptied to atmospheric pressure, is called the "nominal opening pressure".

The difference between the "nominal opening pressure" and the closing pressure is also a function of the ratio of the surface areas on the inflow side and the outflow side of the element of the overflow valve.

A requirement exists, however, that upon the drop of air pressure in the operating brake circuit or circuits to a predetermined minimum pressure (e.g. 40 psi), the parking brakes must automatically be engaged, and such parking brakes should not be capable of being released before this minimum pressure has again increased up to such minimum pressure.

This requirement can be met on a motor vehicle pneumatic brake system equipped with a protection system of the type described, if the "protection pressure" of the operating brake circuits and the closing pressure of the overflow valve of the parking brake circuit are below the above-mentioned minimum pressure. Such a low protection pressure and closing pressure, however, is unacceptable in terms of the above-mentioned parking brake task.

On the other hand, with a higher "protection pressure" and closing pressure, the above-mentioned requirement for the automatic engagement of the parking brakes on a motor vehicle pneumatic brake system, equipped with a protection system of the type described, cannot be met. Accordingly, the parking brake circuit (like the other consumer circuits) is cut off from the defective operating brake circuit or circuits. This cut-off occurs at the "protection pressure" of the overflow valve or valves of the operating brake circuit or circuits, or at the closing pressure of the overflow valve associated with the parking brake circuit. The pressure in the parking brake circuit, therefore, does not participate in the drop of air pressure in the questionable operating brake circuit or circuits below the above-mentioned minimum pressure, and the parking brakes are not evacuated.

Whether the portion of the above-mentioned requirement regarding the prevention of the release of the spring-applied parking brakes as long as the operating brake circuit or circuits have not been pressurized to the above-mentioned minimum pressure can be met—depends on the pressure in the parking brake circuit. This parking brake circuit pressure may, for example, be the residual pressure from an earlier operation of the motor vehicle. If the residual air pressure is higher than the above-mentioned minimum pressure, the requirement is not met; if it is lower, the requirement is met. Therefore, such prior art valve arrangements do not provide the desired functions.

SUMMARY OF THE INVENTION

The present invention provides a bidirectional flow communication passageway which is restricted to limit such bidirectional flow to a predetermined level. Such restriction provides a gradual reduction of pressure in a parking brake circuit which is part of a multiple-circuit fluid pressure responsive system on a motor vehicle.

The pressure reduction permitted is sufficient to activate a parking brake valve in the parking brake circuit when a defect occurs in an operating service brake circuit. Each circuit includes an overflow valve associated therewith which has a minimum predetermined pressure on the inflow side thereof to initially open and allow fluid communication therethrough and a predetermined closing pressure on the outflow side thereof to prevent reverse fluid communication therethrough after closing of the overflow valve. The bidirectional flow communication passageway and the overflow valves for each circuit of the system can be incorporated into a multiple-circuit valve apparatus.

OBJECTS OF THE INVENTION

It is, therefore, an object of the present invention to provide in a fluid pressure responsive multiple-circuit system on a motor vehicle—which system includes at least one operating service brake circuit and a parking brake circuit having a parking brake valve positioned therein—a bidirectional flow control means that, upon a drop of pressure in such operating service brake circuit to a predetermined minimum pressure, will activate such parking brake valve thereby engaging the parking brakes on such motor vehicle.

Another object of the present invention is to provide a multiple-circuit valve apparatus having incorporated therein such control means for activating such parking brake valve disposed in such parking brake circuit.

Still another object of the present invention is to provide a method of operating a fluid pressure responsive multiple-circuit system on a motor vehicle which includes at least one operating service brake circuit and a parking brake circuit having a parking brake valve positioned therein which senses a drop in pressure in such operating service brake circuit to a predetermined minimum pressure and thereafter activates such parking brake valve to thereby engage the parking brakes on such motor vehicle.

A further object of the present invention is to provide a bidirectional flow communication means in a fluid pressure responsive multiple-circuit system on a motor vehicle when such system includes at least one operating service brake circuit and a parking brake circuit.

In addition to the above-described objects and advantages of the present invention, various other objects and advantages will become more readily apparent to those persons skilled in the vehicle and fluid power art from the following more detailed description, when such description is taken in conjunction with the several views shown in the attached drawings and the appended claims

BRIEF DESCRIPTION OF THE INVENTION

Figure 1:
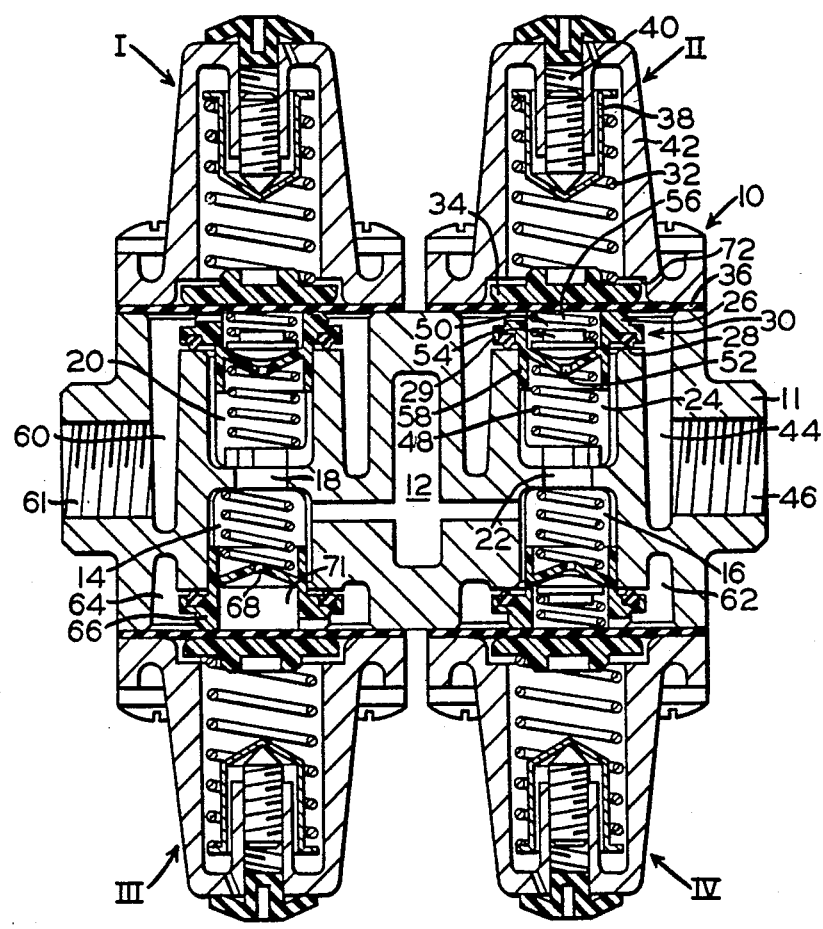
FIG. 1 is a cross-sectional view of a prior art embodiment of a multiple-circuit control valve for controlling preferential pressurization of a fluid pressure responsive multiple-circuit system on a motor vehicle and for activating a parking brake valve positioned within a parking brake circuit when the pressure is an operating service brake circuit reaches a predetermined minimum level.

In one form of the multiple-circuit systems, constructed according to the principles of the present invention (which will be hereinafter-described), there is an overflow valve disposed between a supply line or supply chamber, for which the general term "supply chamber" will be used infra, and a corresponding consumer circuit. One of the primary functions of the overflow valve is, in the event of a defect in one or more of the consumer circuits, to protect the other nondefective consumer circuits from the defective ones. Valves for controlling such multiple-circuit systems are commonly known in the art as "multi-circuit protection valves". The term "protection valve" will be used infra when referring to such valve.

A second form of the multiple-circuit systems, that is likewise constructed according to the principles of the present invention and which will also hereinafter be described, differs from the first form of multiple-circuit systems in that there is an overflow valve located only between the supply chamber and the two operating service brake circuits, while each other consumer circuit is fed via an overflow valve connected ahead of it in series from both operating service brake circuits.

In the latter arrangement, each other consumer circuit is connected in series behind the operating service brake circuits. The principle function of the overflow valve in protecting the nondefective consumer circuits in all of the multiple-circuit systems, according to the present invention, is the same. For this purpose, in the second form of the multiple-circuit system, check valves must be located between the operating service brake circuits and the overflow valve of any other consumer circuit, and these check valves are placed so that they cut off any fluid communication between the operating service brake circuits.

While an overflow valve generally does not prevent a reverse fluid communication, it is possible that the transmission of a pressure drop in one circuit into other circuits can be stopped either by closing of this circuit's overflow valve or by the closing of the other circuit's overflow valves. This means that an excess of a valve's closing pressure will permit a reverse flow.

When referring to the several views of the drawings, identical parts have been designated with identical reference numerals throughout.

Figure 2:
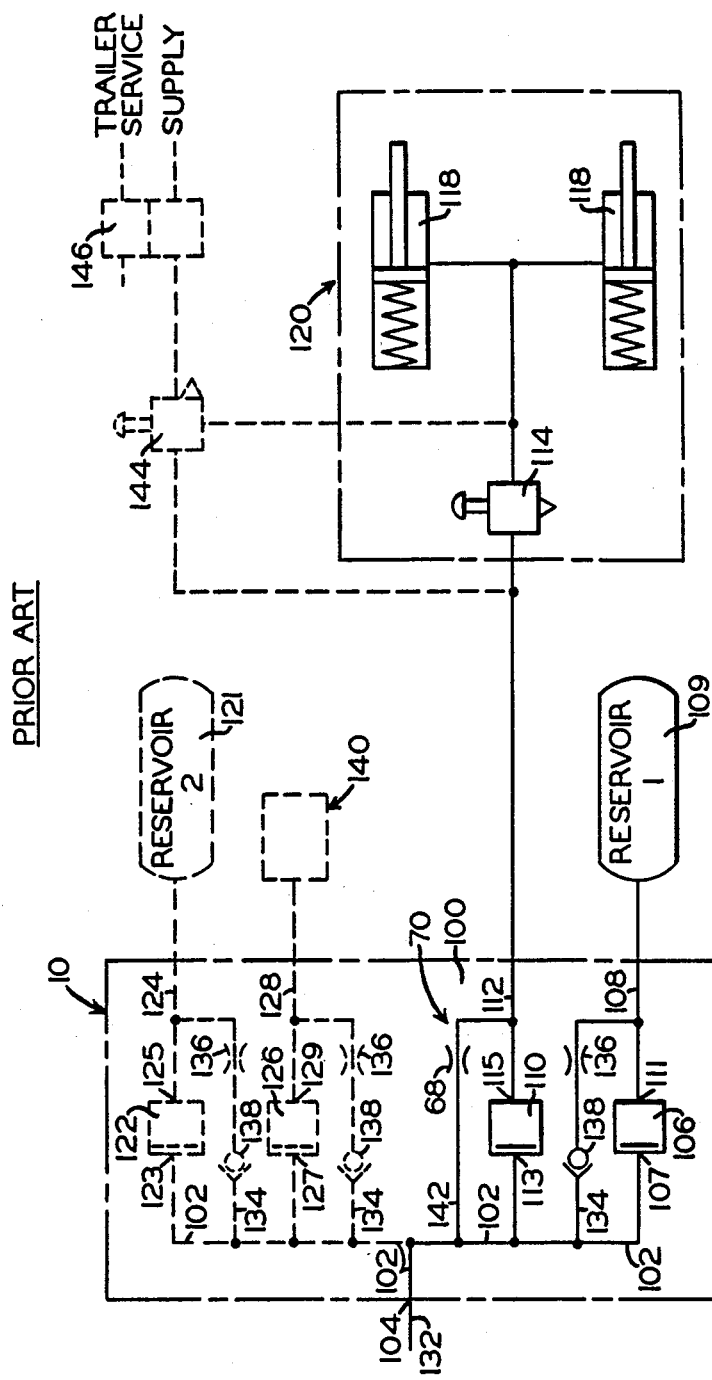
FIG. 2 is a schematic representation of a fluid pressure responsive multiple-circuit system on a motor vehicle which has incorporated therein the prior art embodiment of the multiple-circuit control valve apparatus shown in FIG. 1.

FIG. 1 shows a prior art embodiment for a fluid pressure responsive multiple-circuit protection valve, generally designated 10, for use in the multiple-circuit system shown in FIG. 2. Although, for the purpose of illustration, four overflow valves, generally designated I, II, III and IV, have been shown; it should be understood by those persons skilled in the fluid power and motor vehicle arts that fewer or additional overflow valves may be required. Obviously, the number of overflow valves required will depend upon the number of consumer circuits installed on that particular motor vehicle. Nevertheless, to be within the presently contemplated parameters of the invention, at least two such overflow valves are required; one for an operating service brake circuit, and one for a parking brake circuit.

As illustrated in FIG. 1, there is a supply chamber 12 formed in the housing 11 of the protection valve 10. The supply chamber 12 is connectable in a manner, such as, threads (not shown) with the supply line (not shown) which is, in turn, connectable to the source of fluid pressure (not shown). Such fluid pressure, presently preferred, is compressed air supplied by a compressor mounted on such motor vehicle. The supply chamber 12 is in fluid communication, via tap channel, with inflow chambers 14 of the overflow valve III and 16 of the overflow valve IV. The inflow chamber 14 is in fluid communication, via a duct 18 formed in housing 11, with an inflow chamber 20 of the overflow valve I. The inflow chamber 16 is in fluid communication, via a duct 22 formed in housing 11, with an inflow chamber 24 of the overflow valve II.

The prior art design of the overflow valves, as will be described in detail below, is the basis of overflow valve II; and, unless otherwise specifically noted, the description will also apply with respect to all other overflow valves I, III and IV illustrated.

The overflow valve II includes a check valve, generally designated 30, which is formed by a valve body 26 with a valve seat 28 rigidly attached to the housing 29 of the valve body 26. The valve body 26 is forceably urged by a control spring 32, with the interposition of a spring plate 34 and a flexible membrane 36 thereby urging the valve seat 28 into contact with housing 11 of protection valve 10. On its other end, the control spring 32 abuttingly engages cap-shaped spring holder 38, which is adjustably held in place via a set screw 40 threadedly-engaged with a dome-shaped housing cover 42. By means of the set screw 40, the requisite tension of the control spring 32 is adjustable over a preselected range. The flexible membrane 36 is held tightly between the housing 11 and the spring 32 housing cover 42 and delimits an outflow chamber 44 in fluid communication with a connection 46, which is connectable, preferably by a threaded connection, to one of the consumer circuits (not shown) of the multiple-circuit system. In the inflow chamber 24, there is a spring 48 which abuttingly engages, at one end, the valve body 26; and at the present end, on the protection valve 10 housing 11, and which forceably urges the valve body 26 against the force of the control spring 32.

The valve body 26 includes a central inside aperture 50, the bottom of which runs conically toward the inflow chamber 24. Positioned substantially in the center of the bottom, there is provided a calibrated duct which forms a throttle 52.

Positioned within the inside aperture 50 of the valve body 26, there is a closing element 54. The closing element 54 is in contact, by means of a ball-shaped end-surface, with the conical bottom of the valve body 26. The closing element 54 also includes a band, against which a closing spring 56 is abuttingly engaged at one end thereof. The other end of closing spring 56 of the closing element 54 is held in place against the underside of the flexible membrane 36. The closing spring 56, in this manner, urges the closing element 54 against the conical bottom of the valve body 26. The closing element 54, the closing spring 56, and the line of contact between the spherical end surface of the closing element 54 and the bottom of the valve body 26 form the check valve 30 (see FIG. 2).

The valve body 26 is substantially centered in the inflow chamber 24 with a relatively loose fit, but not sealed by a cylindrical element 58, which projects into the inflow chamber 24. Cylindrical element 58 is preferably formed integral with valve body 26. On its end-surface, toward the membrane 36, the valve body 26 includes radial ducts between its outside circumference and its internal aperture 50.

The design of the overflow valves I and IV is identical to that of the system described above for overflow valve II, with the specific exception that the outflow chamber 60 of the overflow valve I is in fluid communication with a connection 67 which is connectable, in turn, to another of the consumer circuits (not shown), and the outflow chamber 62 of the overflow valve IV is in fluid communication with a connection (not shown) which is connectable to another of the consumer circuits (not shown) of the multiple-circuit system. This connection is oriented perpendicular to the plane of the drawing. Each of the respective connections for the overflow valve I and IV is preferably a threaded connection.

The design of the overflow valve III is also identical to the one described above, with the specific exceptions noted below. The outflow chamber 64 of the overflow valve III is in fluid communication with a connection (not shown) which is connectable to the parking brake circuit (not shown) of the multiple-circuit system. This connection is also perpendicular to the plane of the drawing and is also preferably a threaded connection. In the overflow valve III, the closing spring 56 and the closing element 54 forming the check valve 30 are not present. The valve body 66 of overflow valve III is the same as the valve body 26, with the exception that it includes a throttle 68 instead of throttle 52 (see FIG. 2). However, because the throttles 52 and 68 preferably have the same dimensions, the valve body 66 of the overflow valve III and the valve body 26 are also preferably identical in the present case.

In the general operating description, which follows for the protection valve 10, the initial start-up condition of the consumer circuits (not shown) is assumed to be empty, i.e., pressurized only with atmospheric pressure.

If, as the result of compressed air produced and supplied by a compressed air system (not shown), a pressure builds up in the supply chamber 12 and the inflow chambers 14, 16, 20 and 24; then in the case of the overflow valves I, II and IV, as a result of their respective throttle 52, a pressure builds up in the space enclosed between the bottom of the valve body 26 and the closing element 54 which raises the closing element 54 against the force of the closing spring 56, opens the check valve 30 and causes fluid communication through the throttle 52 and the radial recesses positioned on the side of the valve body 26 on the flexible membrane 36 side into the corresponding outflow chamber; and from there, via the corresponding connection, into the corresponding consumer circuit.

The throttle 52, the inside aperture 50 of the valve body 26, and the radial ducts located on the end-surface of the valve body 26 on the flexible membrane 36 side thereby form, together with the check valve 30, the unidirectional flow communication means, generally designated 69 (see FIG. 2).

It is apparent that, to minimize the response pressure of the check valve 30, the closing spring 56 may not exert any significant closing force on the closing element 54. The closing spring 56, therefore, is designed so that it must supports the closing movement of the closing element 54 under the action of an overpressure in the respective outflow chamber.

At the overflow valve III, when the above-mentioned pressure builds up in the supply chamber 12 and the inflow chamber 14, there is fluid communication through the throttle 68, the inner aperture 71 of the valve body 66, and its radial recesses on the flexible membrane 36 side, into the outflow chamber 64; and from there, via their connection, into the parking brake circuit. In the case of the overflow valve III, before, the throttle 68 and the above-mentioned flow path through the valve body 66 form the bidirectional flow communication means, generally designated 70 (see FIG. 2).

The amount of compressed air conveyed by the compressor to the system must be large enough so that, as a result of the throttling action provided by the unidirectional flow communication mean 69 and the bidirectional flow communication means 70, the pressure which builds up in the respective consumer circuits will remain below the pressure in the supply chamber 12 and the respective inflow chambers 14, 16, 20 and 24.

The following remarks, with respect to overflow valve II, also apply accordingly to all of the overflow valves I, II, III and IV.

The pressure which builds up in the outflow chamber 44 exerts, by means of the effective surface of the flexible membrane 36, a compression force which is opposite to the force of the control spring 32. The pressure prevailing in the inflow chamber 24 also acts, by means of the surface of the valve body 26 enclosed by the valve seat 28 against the force of the control spring 32. If the forces from the pressures in the inflow chamber 24 and the outflow chamber 44 maintain equilibrium with the force of the control spring 32, the closing force is no longer exerted on the check valve 30 and the check valve 30 allows fluid communication.

The pressure in the inflow chamber 24, at which the fluid communication occurs, is the "nominal opening pressure".

If compressed air produced by the compressor continues to be supplied to the system, the check valve 30 opens with a simultaneous pressure increase in the outflow chamber 44 and the associated consumer circuit until the spring plate 34 comes into contact with a stop 72 positioned in the spring housing cover 42. The stop 72 defines the maximum opening stroke of the valve body 26 and, therefore, allowing for some degree of elasticity of the valve body 26 and/or of its seal element; the maximum opening cross-section of the check valve 30.

Therefore, during the nominal opening process, as described above, the valve body 26 and the flexible membrane 36 effectively form a valve piston whereby the surface of the valve body 26, which is enclosed by the valve seat 28, forms the inflow side; and the surplus of the active flexible membrane 36 surface over the inflow side forms the outflow side of the valve piston.

It is assumed, for the purposes of the present description, that the check valve 30 of the overflow valve II opens first, as a result of fabrication tolerances (e.g., adjustment tolerances of the control spring 32). Then, in the respective outflow chamber corresponding to each other overflow valve I, III and IV and the corresponding consumer circuit, the pressure increase continues by means of the corresponding flow communication means. As a result of the greater pressurization of the outflow side of the valve piston of the other overflow valves, the required higher opening pressure on its opening side is compensated so that the latter also opens essentially at the nominal opening pressure. The beneficial result is that the other overflow valves will also open with some degree of certainty, specifically up to their full opening cross-section.

If a residual pressure is still present in one or more consumer circuits, perhaps from a previous operation of the vehicle, which is greater than the pressure which leads to the nominal opening pressure, then, for the reasons discussed above, it is important to note that the opening pressure of the corresponding overflow valve or valves will be less than the designed nominal opening pressure.

The cross-section of the throttles 52 and 68 is to be sized such that, the amount of compressed air communicated therethrough is not sufficient to build up a pressure in a consumer circuit with a significant defect, which will cause a pronounced reduction of the opening pressure (on the inflow side of the valve piston) via the outflow side of the valve piston of the corresponding overflow valve. Overflow valves of any consumer circuit or circuits with a significant defect, therefore, will remain closed up to a maximum opening pressure which exceeds the nominal opening pressure, since the corresponding valve piston with its outflow side cannot exert a supporting action.

This increase of the opening pressure of the overflow valve of a particular consumer circuit with a significant defect from the nominal to the maximum opening pressure is an advantage gained by the present invention. The result is that the pressure level which again builds up in the remaining intact consumer circuits, after the closing of the overflow valve of the defective consumer circuit, is also increased accordingly.

If, after the opening of the check valve 30, the pressure between the inflow chamber 24 and the outflow chamber 44 is at equilibrium (any possible overpressure in the inflow chamber 24, as a result of flow resistances in the valve cross-section are ignored), then the valve body 26 is at an equilibrium of force and the flexible membrane 36 serves as the valve piston with its entire active surface. On this relatively large surface, a pressure, less than the opening pressure, is necessary to maintain equilibrium with the force of the control spring 32 and thus keep the check valve 30 open. For this reason, the pressure necessary in the inflow chamber 24 and the outflow chamber 44 for the closing of the check valve 30 and thus the overflow valve II, which is measured as the closing pressure of the overflow valve in the inflow chamber 24, is less than the opening pressure.

By way of example only, and for the protection valve 10 illustrated, the nominal opening pressure may be about 101 psi (7 bar) with a tolerance of generally about −4.3 psi (0.3 bar) and the closing pressure may be generally about 65 psi (4.5 bar).

If the check valves 30, or at least two of them are open, then it is readily apparent that a pressure equalization between the consumer circuits is possible. A pressure difference is thereby formed at the check valves 30, carrying a flow to the outflow chamber 44 or from the outflow chamber 44 to the inflow chamber 24 which, if the spring 48 were not present, would lead to the closing of the check valve 30 or check valves 30 in question. The above-mentioned pressure difference arises from the flow resistances at the check valve 30. The spring 48 must, therefore, be designed such that in normal operation it will compensate for these flow resistances.

It should be apparent to persons skilled in the valve and motor vehicle art that the embodiment of a multiple-circuit protection valve 10, illustrated in FIG. 1, can be converted with relatively simple modification to all the other configurations of overflow valves and their connections, flow communication means, and check valves to be hereinafter-described in the specification and claims.

For example, from the above description it should be obvious to a person skilled in thoese arts that a basic protection valve 10, for use in a motor vehicle multiple-circuit fluid pressure responsive system, must include at least two overflow valves; one for each of an operating service brake circuit and one for a parking brake circuit, and a bidirectional flow communication means having one end thereof connected to the parking brake circuit and the other end thereof being connectable to a number of diffrent locations, depending on the particular system design, with each of these minimum elements capable of being positioned in a common housing.

FIGS. 2 through 5 generally illustrate certain features of such a basic protection valve, generally designated 10, which includes a housing 100. Housing 100 has a first fluid pressure communication passageway 102 formed therein. The first passageway 102 is connectable at one end 104 thereof to a source (not shown) of operating fluid pressure, such as, an air compressor positioned on a motor vehicle.

A first overflow valve 106 is positioned within the housing 100. First overflow valve 106 has an inflow port 107 connected to receive operating fluid from the first passageway 102. The first overflow valve 106 has a first minimum predetermined pressure required on the inflow side to initially open and thereby communicate fluid therethrough, and a first predetermined closing pressure on the outflow side to thereby prevent reverse fluid communication therethrough after closing of first overflow valve 106. To ensure proper operation, the first closing pressure must be less than the first minimum initial opening pressure.

A second fluid pressure communication passageway 108 is formed in the housing 100 and is connected at one end thereof to an outflow port 111 of first overflow valve 106. The other end of the second passageway is connectable to a first operating service brake circuit 109 on such motor vehicle to communicate operating fluid from such first overflow valve 106 to the first operating service brake circuit 109. The first operating service brake circuit 109 is represented schematically in the several views as a "Reservoir 1".

Figure 3:
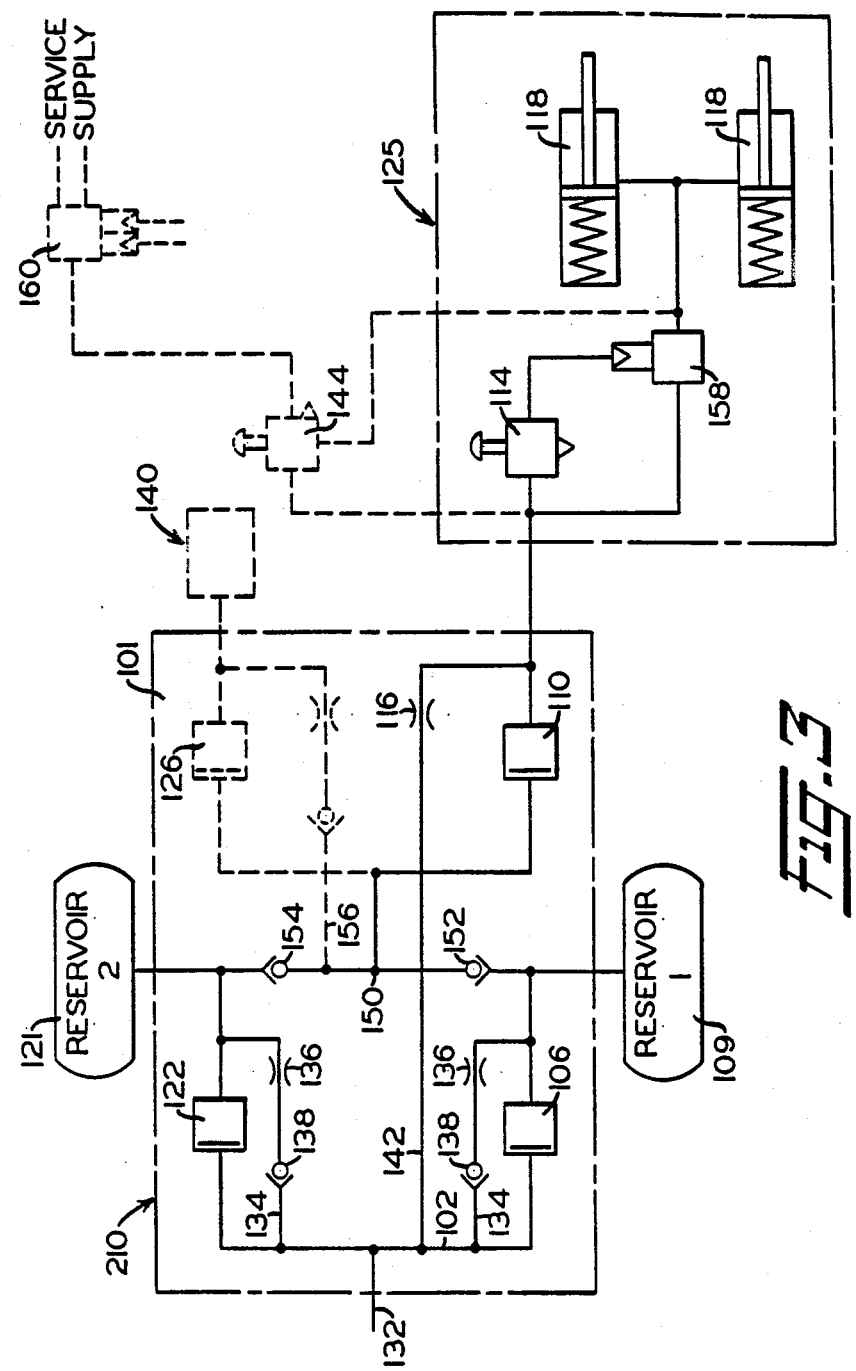
FIG. 3 is a schematic representation of a fluid pressure responsive multiple-circuit system on a motor vehicle which incorporates therein a control valve apparatus constructed according to an alternative embodiment of the present invention.
Figure 4:
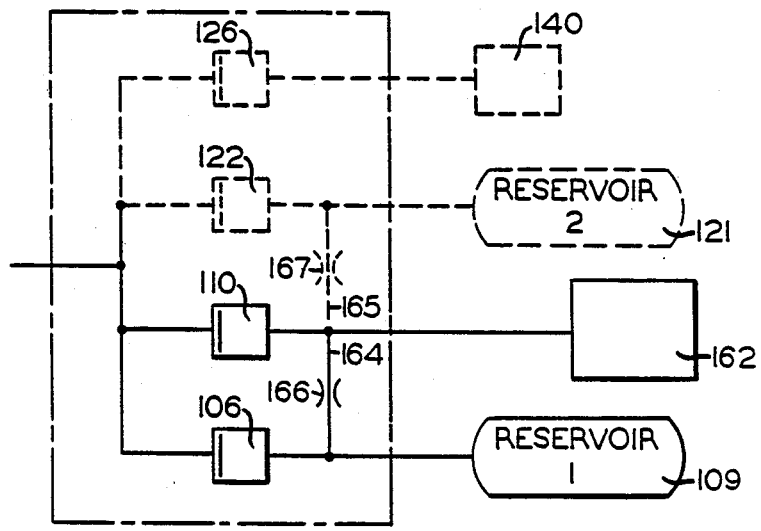
FIG. 4 is a schematic representation of a fluid pressure responsive multiple-circuit system on a motor vehicle which incorporates therein a control valve apparatus constructed according to a second alternative embodiment of the present invention.
Figure 5:
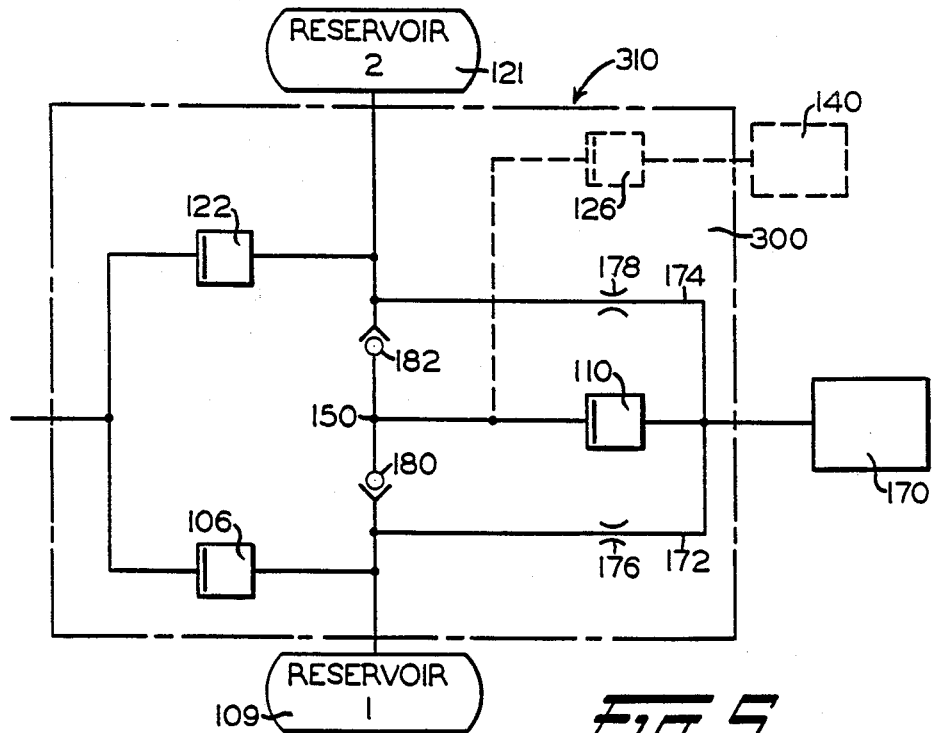
FIG. 5 is a schematic representation of a fluid pressure responsive multiple-circuit system on a motor vehicle which incorporates therein a control valve apparatus constructed according to a third alternative embodiment of the present invention.

A second overflow valve 110 is positioned within the housing 100 and has an inflow port 113 connected to receive operating fluid from one of the first passageway 102 (FIGS. 2 and 4) and the second passageway 108 (FIGS. 3 and 5). Second overflow valve 110 has a second minimum predetermined pressure required on the inflow side to initially open thereby communicating fluid therethrough and a second predetermined closing pressure on the outflow side thereby preventing reverse fluid communication therethrough after closing of second overflow valve 110. The closing pressure of second overflow valve 110 must be less than the minimum initial opening pressure of both the first overflow valve 106 and the second overflow valve 110.

A third fluid pressure communication passageway 112 is formed in the housing 100 and has one end thereof connected to the outflow port 115 of the second overflow valve 110. The opposite end of the third passageway 112 is connectable to a parking brake circuit, generally designated 120, on such motor vehicle. This passageway 112 communicates the operating fluid from the second overflow valve 110 to the parking brake circuit 120.

A bidirectional flow communication means, generally designated 70, is formed in the housing 100 and has one end thereof connected to the third passageway 112 and is connected at the opposite end thereof to one of the first passageway 102 (FIGS. 2 and 3) and the second passageway 108 (FIGS. 4 and 5). Bidirectional flow communication means 70 is restricted to limit fluid communication between the third passageway 112 and such one of the first passageway 102 and second passageway 108 to a predetermined level, and to gradually reduce pressure in the parking brake circuit 120 sufficient to activate a parking brake valve 114 (FIG. 2), which is a part of parking brake circuit 120. Parking brake valve 114 is activated when a defect occurs in the first operating service brake circuit 109. The restricted flow in the bidirectional flow communication means 70 is preferably achieved by insertion of a throttle valve 68.

In the presently preferred practice of the invention, the first minimum pressure required to initially open the first overflow valve 106 will be somewhat less than the second minimum pressure required to initially open the second overflow valve 110. In this case, on start-up of the fluid pressure responsive multiple-circuit system, the first operating service brake circuit 109 will be charged prior to the parking brake circuit 120 and thus prevent premature release of the parking brakes 118 (FIG. 2). It is also desirable that the closing pressure of the first overflow valve 106 and the second overflow valve 110 be substantially the same.

If the motor vehicle to receive the protection valve 10 includes a second operating service brake circuit 121 (represented schematically in the drawings as "Reservoir 2"), such protection valve 10 would include a third overflow valve 122 positioned within the housing 100. The third overflow valve 122 has an inflow port 123 connected to receive the required operating fluid from the first passageway 102. The third overflow valve 122 has a third minimum predetermined fluid pressure required on the inflow side to initially open, thereby communicating fluid therethrough, and a third predetermined closing fluid pressure. The third closing pressure must be less than the minimum initial opening pressures of each of the first and the second and the third overflow valves 106, 110 and 122, respectively. Further, in the presently contemplated preferred embodiment of the present invention, both the first overflow valve 106 and the third overflow valve 122 will have an initial minimum opening pressure required that is less than the initial minimum opening pressure of the second overflow valve 110.

To communicate the operating fluid pressure from the third overflow valve 122 to the second operating service brake circuit 121, a fourth fluid pressure communication passageway 124 is formed in the housing 100. One end of the fourth passageway 124 is connected to the outflow port 125 of the third overflow valve 122 and the opposite end thereof is connectable to the second operating service brake circuit 121.

Many of the commercial vehicles to which the present invention is most applicable include auxiliary equipment which also responds to fluid pressure; such as, air horns, for example. For this reason, an auxiliary circuit, generally designated 140, is provided. Therefore, it may be desirable for the protection valve 10 to include a fourth overflow valve 126 positioned within the housing 100. The fourth overflow valve 126 has an inflow port 127 connected to receive such operating fluid from one of the first passageway 102 (FIGS. 2 and 4), the second passageway 108 (FIGS. 3 and 5), the third passageway 112 (FIGS. 3 and 5), the fourth passageway 124 (FIGS. 3 and 5), and a combination of the second and fourth passageways 108 and 124, respectively. The fourth overflow valve 126 has a fourth minimum predetermined pressure required on the inflow side to initially open and thereby communicate fluid therethrough, and a fourth predetermined closing pressure on the outflow side to thereby prevent reverse fluid communication therethrough after closing of fourth overflow valve 126. The fourth closing pressure of the fourth overflow valve 126 must be less than the minimum initial opening pressure of each of the first and the second and the third and the fourth overflow valves 106, 110, 122 and 126, respectively. The minimum initial opening pressure of the fourth overflow valve 126 is preferably higher than the minimum initial opening pressure of both first and third overflow valves 106 and 122, respectively.

In order to communicate the required fluid pressure from the fourth overflow valve 126 to the auxiliary service circuit 140, a fifth fluid pressure communication passageway 128 is formed in the housing 100. The fifth passageway 128 is connected at one end thereof to an outflow port 129 of the fourth overflow valve 126 and is connectable at the opposite end thereof to the auxiliary service circuit 140.

Now referring particularly to FIG. 2, a first operating service brake circuit 109 (schematically illustrated as "Reservoir 1") is connected to receive operating fluid from the supply chamber 102 in housing 100 of the protection valve 10 through a first overflow valve 106. The supply chamber 102 is connectable to a supply line 132 which, in turn, is connected with a compressed air production system (not shown) which makes the required volumes of compressed air available in a known way and with a controlled nominal pressure.

The drawing further illustrates a parking brake circuit 120 connected with the supply chamber 102 through an overflow valve 110.

In dotted lines, there is illustrated two other consumer circuits; namely, a second operating brake circuit 121 (symbolized by "Reservoir 2") and an auxiliary consumer circuit 140 (symbolized by a rectangle). In the connections between these consumer circuits and the supply chamber 102, there are overflow valves 122 and 126, respectively. The dotted lines of these consumer circuits indicate that they can be present as an option. If necessary, additional circuits with additional overflow valves can also be provided without departing from the spirit and scope of the present invention.

As the drawing plainly shows, in this embodiment, all the overflow valves 106, 110, 122 and 126 are of the same level in relation to the supply chamber 102 or the supply line 132, i.e., parallel.

The first operating brake circuit 109, the second operating brake circuit 121, and the auxiliary consumer circuit 140 are also connected by means of a throttle channel 134, including a throttle 136 and a check valve 138 and in fluid communication bypassing relationship between their corresponding overflow valve and the supply chamber 102.

The parking brake circuit 120, while bypassing its overflow valve 110, also includes a bidirectional flow communication means 70 which includes a throttle 68 and is also connected at one end thereof with the supply chamber 102.

Each of the above-mentioned overflow valves 106, 110, 122 and 126 and their respective throttle channels can also be connected, individually or all at once, directly with the supply line 102.

The operating brake circuits 109 and 121 operate in a known way and one which is therefore not described here in any greater detail. They may be, for example, pneumatically-activated wheel brakes with a mechanical or hydraulic transmission and the necessary control apparatus to perform the desirable operation.

The auxiliary consumer circuit 140 also operates in a known way and one which is therefore not described here in any greater detail. The auxiliary consumer circuit 140 may be connected to pneumatically-operated auxiliary equipment; such as, door-closers, gearshifting apparatus, differentials, transmitters, etc.

The parking brake circuit 120 at least consists of parking brakes, which are schematically shown as operating cylinders 118, and a parking brake valve 114.

The parking brakes 118 must be able to be held by mechanical means in the braking position and by pneumatically-operated release means in the release position. For this purpose, in the present case, the parking brake cylinders 118 are designed as spring-loaded cylinders. They can also be designed as other types of systems, however, e.g., as interlock cylinders.

The parking brake valve 114 is designed as a mechanically activated ventilation and evacuation valve, which evacuates the release means of the parking brakes 118 in a park position; and, in a moving position, pressurized with the full pressure available in the parking brake circuit 120.

The parking brake valve 114 is usually moved from the park position into the travel position or vice-versa by manually pushing or pulling a button (not shown) mounted on the motor vehicle. The parking brake valve 114, moreover, is designed so that if the pressure in the parking brake circuit 120 drops below a predetermined minimum pressure (e.g. 40 psi), it will automatically jump out of the travel position into the park position. Furthermore, the parking brake valve 114 should be designed so that it cannot be returned to the travel position until the parking brake circuit 120 has again been pressurized to at least the above-mentioned minimum pressure.

In the present case, the parking brake valve 120 is located in the compressed air line of the release means. It is also known that a relay valve (not shown) can be placed in this air line and the parking brake valve 114 in the control line of such relay valve.

The illustrated parking brake circuit 120 may also include valves which are useful for operation of the motor vehicle with trailers, a trailer supply valve 144, and a tractor protection valve 146. These are shown in dotted lines, because they are not necessary on a motor vehicle which is not intended for use with trailers.

These valves 144 and 146 make possible in a manner which is known and which is therefore not explained here in any greater detail, the connection of the trailer pneumatic system to the tractor pneumatic system. Valves 144 and 146 provide a protection of the tractor pneumatic system against disruptions in the trailer pneumatic system and the co-control of the trailer brakes when the operating brakes are activated, or when the parking brakes 118 of the tractor are activated manually or automatically.

The function of the overflow valves 106, 110, 122 and 126 contained in the illustrated motor vehicle pneumatic system and their role in the protection of the intact consumer circuits, in the case of defects in one or more consumer circuits, has been extensively explained above.

The safety action for the tractor pneumatic system, achieved by means of the tractor protection valve 146, is an additional safety measure; which, in many cases, may be superfluous on account of the safety action of the protection system formed in connection with the overflow valves 106, 110, 122 and 126 corresponding to their respective consumer circuits.

In the illustrated protection valve 10, a reverse flow from the operating service brake circuits 109 and 121 and the auxiliary consumer circuit 140, through the throttle channels 136, into the supply chamber 102; and from there, possibly into other consumer circuits, is prevented by the check valve 138 located in each unidirectional flow communication means 134.

The parking brake circuit 120, however, is constantly connected by means of bidirectional flow communication means 70 having a throttle channel 68 with the supply chamber 102.

Should a defect occur in the parking brake circuit 120, which leads to a drop in pressure in this circuit and in the supply chamber 102; then, as described above, the corresponding overflow valve 110 will close at its closing pressure; which, in this case, is the safety pressure, and protect the other consumer circuits. If the pressure continues to drop, the above-mentioned minimum pressure is reached, with the result that the parking brake valve 114 automatically jumps into its park position; and thereby, via the trailer supply valve 144 and the tractor protection valve 146, applies the trailer brakes.

Should a defect occur in another consumer circuit, which leads to a drop in pressure in the supply chamber 102 and in the other consumer circuits, then the respective overflow valve of this defective circuit closes at its closing pressure (safety pressure). If the compressed air system continues to supply compressed air, the pressure in the supply chamber 102 and in the intact circuits increases again until the respective overflow valve of the defective consumer circuit opens at its opening pressure.

If, on the other hand, after the closing of the overflow valve of the defective circuit, the compressed air system does not continue to produce compressed air; or if the supply is interrupted, as is the case, for example, when the motor vehicle is shut down; then, via the unidirectional flow communication means 134 of the defective circuit, the pressure in the supply chamber 102 and in the parking brake circuit 120 will decrease to the pressure still present in the defective circuit and will follow it if the pressure continues to decrease. If, thereby, the above-mentioned minimum pressure in the defective consumer circuit, the supply chamber 102, and the parking brake circuit 120 is reached; the parking brake valve 114 jumps into the park position with the result that the parking brakes are applied by their mechanical means (and, if necessary, the trailer brakes).

As can be seen from the preceding, if no further compressed air is produced by the compressed air installation, the requirement mentioned above is met even if the pressure drops is only one operating brake circuit 109 or 121.

The multiple-circuit fluid pressure responsive system installed on a motor vehicle which includes a pneumatic brake system, which is illustrated schematically in FIG. 3, also relates to such a system. This configuration includes a first operating brake circuit 109 and a second operating brake circuit 121 with the corresponding overflow valves 106 and 122 and their respective unidirectional fluid flow communication means 134 and with a parking brake circuit, generally designated 125, with its corresponding overflow valve 110 and bidirectional flow communication means 142.

In this illustration of the fluid pressure responsive multiple-circuit system, only the operating service brake circuits 109 and 121 are on the same level relative to the supply chamber 102, i.e., arranged in parallel; while the parking brake circuit 125, with its overflow valve 110, is connected downstream of the operating service brake circuits 109 and 121. For this reason, the two operating service brake circuits 109 and 121 are brought together by means of branches at a point 150; which, if desired, can be designed as a pressure chamber within the housing 101 of protection valve 210. So that no exchange of compressed air can take place between the operating service brake circuits 109 and 121, via the above-mentioned branches, there is a check valve 152 and 154 which cuts off the fluid communication into the respective operating service brake circuit 109 and 121 located in each respective branch.

The point 150 represents the inflow side of the overflow valve 110 of the parking brake circuit 125. If, as indicated by the dotted representation of an auxiliary consumer circuit 140, and its overflow valve 126, there are other consumer circuits; then, in this case, the inflow sides must be connected from their overflow valves (also to the point 150 or to connections proceeding therefrom).

In spite of the fact that the parking brake circuit 125 is located downstream, the corresponding bidirectional fluid flow communication means 142, like the unidirectional fluid flow communication means 134 corresponding to the operating service brake circuits 109 and 121, is connected directly with the supply chamber 102 (or the supply line 132).

The auxiliary consumer circuit 140 (shown in dotted lines) is connected by means of a unidirectional fluid flow communication means 156 (also shown in dotted line) with the point 150 or with a line leading to it. Except for its different location, this unidirectional fluid flow communication means 156 has the same design as the unidirectional fluid flow communication means 134. In the same manner, any other consumer circuits which may be present can be connected with the point 150. The unidirectional fluid flow communication means 156 of the auxiliary consumer circuit 140 and/or the fluid flow communication means of any other consumer circuits which may be present can also be connected with the supply chamber 102 or with the supply line 132. The auxiliary consumer circuit 140 and/or any other consumer circuits, except the parking brake circuit 125 (which may be present) can, however, be designed without any unidirectional fluid flow communication means at all.

The surrounding dotted line further indicates that all of the overflow valves 106, 110, 122 and 126 as well as the corresponding connections, branches, check valves 152 and 154, and unidirectional fluid flow communication means 134 and 156 and bidirectional fluid flow communication means 142 and the supply chamber 102 can be combined in a single housing 101 into a multi-circuit protection valve 210.

With regard to the configuration of the operating brake circuits 109 and 121 and of the auxiliary consumer circuit 140, the remarks made with respect to FIG. 2 also apply to the configuration in FIG. 3.

The parking brake circuit 125 includes, in contrast to the parking brake circuit 120 of FIG. 2, a relay valve 158 in the compressed air feed line of the release means of the activation cylinders of the parking brakes 118. Furthermore, in the trailer circuit, which circuit is again optional and therefore shown in dotted lines, there is provided a trailer control valve 160.

The parking brake valve 114 is located, in the illustrated example, in the control line of the relay valve 158. By means of the relay valve 158, in a manner which is known and therefore not explained in any further detail here, the response time (actuation and release time) of the parking brakes 118 is shortened. The parking brake 118, however, as shown in the example illustrated in FIG. 2, can also be located directly in the compressed air feed line of the release means.

The trailer control valve 160 is preferably designed as a relay valve which can be activated by both operating service brake circuits 109 and 121. In this manner, when the brakes are activated in at least one of the operating service brake circuits 109 and 121, it releases a pressure to the trailer brake line (service line) which is a function of the braking pressure of the operating one of the at least one operating service brake circuits 109 and 121. The trailer supply valve 144 is positioned in the supply line of the trailer control valve 160.

The trailer control valve 160 is preferably designed so that it cuts off the operating service brake circuits 109 and 121, and even in the case of internal leaks which would not allow excess compressed air out of the at least one operating brake circuit into the remaining circuits. It is, therefore, advantageously suited to maintain the mutual protection of the operating service brake circuits 109 and 121, which is essentially guaranteed by the protection system constructed according to the principles of the present invention. In addition, the trailer control valve 160 offers the advantage of improved actuation and release response times of the trailer brakes.

Compressed air flows in, via the corresponding unidirectional fluid flow communication means 134 and 156 and the bidirectional fluid flow communication means 142 (in this embodiment of the present invention) into all the consumer circuits 109, 121, 125 and 140 at the same time, and therefore, at the same level. This is also true if, in a manner not shown, the unidirectional fluid flow communication means 156 of the auxiliary consumer circuit 140 is connected directly to the supply chamber 102 or the supply line 132. This also applies accordingly for any additional consumer circuits which may be present.

The accumulation of the opening pressure itself, however, takes place in this embodiment of the present invention, preferentially for the overflow valves 106 and 122 of the operating service brake circuits 109 and 121, respectively. Only if at least one of the operating service brake circuits 109 or 121 is pressurized up to the opening pressure of the downstream overflow valves 110 and 126, do they open. If the auxiliary consumer circuit 140 and any other consumer circuits (which may be present) do not have any unidirectional fluid flow communication means 156 they must be positioned downstream of the parking brake circuit 125. If, in these consumer circuits, there is no residual pressure—or only a residual pressure which is lower than that which builds up in the other circuits via the fluid flow communication means—the overflow valves corresponding to these consumer circuits open at the maximum opening pressure, or a higher opening pressure, unless they are designed for a lower opening pressure.

With the arrangement of the overflow valves 106, 110, 122 and 126 (shown in this configuration), a priority order can be established for the increase of pressure in the individual respective consumer circuits 109, 125, 121 and 140. It is, therefore, possible to fill up the operating service brake circuits 109 and 121 first which is frequently the most desirable sequence.

Otherwise, the comments made with respect to the detailed description of FIG. 2 apply equally as well to the arrangement shown and described for FIG. 3.

The fluid pressure resonsive multiple-circuit protection system, shown schematically in FIG. 4 as a portion of a motor vehicle pneumatic system, has the same basic construction as shown in FIG. 2. This protection system, however, does not exhibit any of the fluid flow communication means in bypassing relationship of the overflow valves 106, 110, 122 and 126.

Therefore, to solve the problem addressed by the present invention; in this case, the parking brake circuit, symbolized by a rectangle 162, and the first operating brake circuit 109 are connected to one another by a bidirectional fluid flow communication means 164 in which there is a throttle 166. In the same manner the parking brake circuit 162 is connected with the optional second operating brake circuit 121, if the second operating service brake circuit 121 is present, as indicated by the fact that it is shown in dotted lines.

In this case, therefore, there is a bidirectional fluid flow communication means 164 having a throttle 166 therein, connected between the parking brake circuit 162 and the operating service brake circuit 109; and, if appropriate, a second bidirectional fluid flow communication means 165 having a throttle 167 therein, connected between the operating service brake circuit 121 and the parking brake circuit 162. It is apparent that, if a drop in pressure should occur in one operating service brake circuit, the pressure in the parking brake circuit 162 (and in the other operating service brake circuit, if any) will also drop; and when the minimum pressure is reached, the parking brake valve (not shown) can be made to actuate in the manner described above.

FIG. 5 illustrates another alternative arrangement for a portion of a motor vehicle pneumatic system. It is a schematic view of a protection system with parallel operating brake circuits 109 and 121 and a downstream parking brake circuit (indicated by the rectangle 170) and other downstream consumer circuits (indicated by the dotted auxiliary consumer circuit 140). This protection system too, with the exception of the parking brake circuit 170, has no unidirectional fluid flow communication means in bypassing relationship with respect to the overflow valves 106, 122 and 126.

The problem addressed by the invention is solved in this embodiment by bidirectional fluid flow communication means 172 and 174, in each of which there is a respective throttle 176 and 178 between the parking brake circuit 170 and the branches of the operating service brake circuits 109 and 121 at the point 150. Thereby, the bidirectional fluid flow communication means 172 and 174 must empty into the above-mentioned branches upstream of the check valves 180 and 182.

In this example too, surrounding dotted lines indicate that the overflow valves, including the corresponding connections and check valves 180 and 182 and the bidirectional fluid flow communication means 172 and 174, can be combined in one housing 300 into a multi-circuit protection valve 310.

In this example, the parking brake circuit 170 and each operating service brake circuit 109 and 121 are constantly connected by means of the bidirectional fluid flow communication means 172 and 174. In this manner, in this example too, the problem addressed by the invention is solved in the manner described with respect to FIG. 4.

Otherwise, the introductory remarks and the operating description given for the embodiment, illustrated in FIG. 2, also apply for the embodiments illustrated in FIGS. 4 and 5.

The explanations given for the embodiments illustrated in FIGS. 2 and 3 also apply for the operating brake circuits 109 and 121, the auxiliary consumer circuit 140, and the parking brake circuits 162 and 170 of the embodiments illustrated in FIGS. 4 and 5.

From the above-detailed description of FIGS. 2–5 of the present invention, it should be obvious to those persons skilled in the art that the various overflow valves, check valves, throttle channels, and throttle valves could be connected into a multiple-circuit fluid pressure responsive system as individual components. Such systems may incorporate only two circuits, i.e., a service brake circuit and a parking brake circuit or it may also include a second service brake circuit as well as an auxiliary circuit. All such arrangements are contemplated by and within the scope of the appended claims.

One form of a presently preferred method of operating a fluid pressure responsive multiple-circuit system on a motor vehicle will now be described. Such operating method includes, on start-up of the motor vehicle, generating a volume of pressurized fluid from a source positioned on such motor vehicle; thereafter, communicating at least a portion of such volume of pressurized fluid from the source to a first overflow valve 106 positioned on the motor vehicle. The first overflow valve 106 has a first minimum predetermined pressure that is required at the inflow side thereof to initially open and thereby permit fluid communication therethrough. The first overflow valve 106 also has a first predetermined closing pressure on the outflow side thereof and thereby prevents a reverse communication of fluid therethrough after closing of first overflow valve 106. It is essential that the first closing pressure be less than the first initial opening pressure. Fluid from the outflow side of the first overflow valve 106 is communicated to a first operating service brake circuit 109 positioned on the motor vehicle thereby (assuming no leaks); pressurizing and making such first operating service brake circuit 109 operational.

Fluid is also communicated to a second overflow valve 110 positioned on such motor vehicle. In one embodiment of the invention, the second overflow valve 110 may receive such fluid communicated thereto from the source; while in another alternative form of the invention, the second overflow valve 110 may receive such fluid communicated thereto from the fluid being communicated to the first operating service brake circuit 109. The second overflow valve 110 has a second minimum predetermined pressure that is required on the inflow side thereof to initially open and thereby permit fluid to be communicated therethrough. The second overflow valve 110 also has a second predetermined closing pressure on the outflow side thereof and thereby prevents a reverse communication of fluid therethrough after closing of second overflow valve 110. It is also essential to the operation of the invention that the second predetermined closing pressure be less than both the first and the second minimum initial opening pressure. Fluid from the outflow side of the second overflow valve 110 is communicated to the parking brake circuit 120 positioned on such motor vehicle. Again, assuming no leaks in either the first operating service brake circuit 109 or the parking brake circuit 120, such parking brake circuit 120 will be pressurized thereby making it operational and releasing such parking brakes on the motor vehicle.

In order to protect the system, in the event of a defect occurring in the operating service brake circuit 109, a bidirectional fluid flow must be established between the fluid being communicated to the parking brake circuit 120 and one of either the fluid communicated from the source or the fluid communicated from the operating service brake circuit 109. It is of extreme importance, however, that the bidirectional flow be restricted, thereby limiting such bidirectional flow to a predetermined level. Such restricted flow will permit a gradual reduction of pressure in the parking brake circuit 120 sufficient to automatically activate the parking valve 114 should a defect occur in the operating service brake circuit 109.

If the motor vehicle includes a dual-operating service brake circuit as part of its multiple-circuit system, the operating method contemplated by the present invention would also include communicating at least a portion of the pressurized fluid from the source to a third overflow valve 122 positioned on such motor vehicle. The third overflow valve 122 will have a third minimum predetermined pressure that is required at the inflow side thereof to initially open and thereby permit fluid to be communicated therethrough. The third overflow valve 122 will also have a third predetermined closing pressure on the outflow side thereof and thereby prevents a reverse communication of fluid therethrough after closing of third overflow valve 122. It is important for proper functioning of the present invention, that the third closing pressure be less than all of the first and the second and the third minimum initial opening pressures. Fluid from the third overflow valve 122 is communicated to the second operating service brake circuit 121 positioned on such motor vehicle. As before, assuming no leaks, the second operating service brake circuit 121 will become pressurized and made operational.

In the case where a second operating service brake circuit 121 is provided and the bidirectional fluid communication is between the parking brake circuit 120 and the first operating service brake circuit 109, it is desirable to establish a second and preferably identical bidirectional fluid communication between such parking brake circuit 120 and the second operating service brake circuit 121, so that if a defect should occur in the second operating service brake circuit 121 a gradual reduction in pressure in the parking brake circuit 120, sufficient to activate the parking brake valve 114, may follow.

Some motor vehicles are equipped with auxiliary equipment which responds to fluid pressure and requires separate circuits. On such motor vehicles, the operating method (according to the present invention) contemplates communicating fluid to a fourth overflow valve 126 from one of the source of fluid pressure, and the fluid communicated to the parking brake circuit, and a combination of the fluid communicated to the first and the second operating service brake circuits 109 and 121, respectively. The fourth overflow valve 126 has a fourth minimum predetermined pressure that is required at the inflow side thereof to initially open and thereby permit fluid communication therethrough. The fourth overflow valve 126 further has a fourth predetermined closing pressure on the outflow side thereof and thereby prevents a reverse communication of fluid therethrough after closing of fourth overflow valve 126. As before, it is critical to the successful operation of the invention that the fourth closing pressure be less than the first and the second and the third and the fourth minimum initial opening pressures. Fluid from the outflow side of the fourth overflow valve is communicated to the auxiliary service circuit 140 positioned on such motor vehicle.

While a number of alternative embodiments of the present invention have been shown and described with particularity, it should be obvious to those persons skilled in the fluid power and motor vehicle arts that other adaptations and modifications can be made without essentially departing from the spirit and scope of the attached claims.

I claim:

1. A multiple-circuit valve apparatus to control a fluid pressure responsive multiple-circuit system on a motor vehicle having a parking brake valve, said multiple-circuit valve apparatus comprising:
    (a) a housing;
    b) a first fluid pressure communication passageway formed in said housing and having one end thereof connectable to a source of operating fluid pressure;
    (c) a first overflow valve positioned within said housing and having an inflow port connected to receive such operating fluid from said first passageway, said first overflow valve having a first minimum predetermined pressure required on the inflow side to initially open thereby communicating fluid therethrough and a first predetermined closing pressure on the outflow side thereby preventing reverse fluid communication therethrough after closing of said first overflow valve said first predetermined closing pressure being less than said first minimum initial opening predetermined pressure;
    (d) a second fluid pressure communication passageway formed in said housing and connected at one end thereof to an outflow port of said first overflow valve and having the other end thereof connectable to an operating service brake circuit on such motor vehicle to communicate such operating fluid from said first overflow valve to such operating service brake circuit;
    (e) a second overflow valve positioned within said housing and having an inflow port connected to receive such operating fluid from said first passageway, said second overflow valve having a second minimum predetermined pressure required on the inflow side to initially open thereby communicating fluid therethrough and a second predetermined closing pressure on the outflow side thereby preventing reverse fluid communication therethrough after closing of said second overflow valve, said second predetermined closing pressure being less than said first and said second minimum initial opening pressure;
    (f) a third fluid pressure communication passageway formed in said housing and connected at one end thereof to an outflow port of said second overflow valve and having the other end thereof connectable to such parking brake circuit on such motor vehicle to communicate such operating fluid from said second overflow valve to such parking brake circuit; and
    (g) a first bidirectional flow communication means formed in said housing and connected at one end thereof to said third passageway and connected at the other end thereof to said second passageway for communicating fluid between said third passageway and said second passageway, said first bidirectional flow communication means being restricted to limit such bidirectional flow to a predetermined level and to gradually reduce pressure in such parking brake circuit sufficient to activate such parking brake valve when a defect occurs in such operating service brake circuit.

2. A fluid pressure responsive multiple-circuit system multiple-circuit valve apparatus, according to claim 1, wherein said first bidirectional flow communication means includes a first throttle valve disposed intermediate said ends thereof.

3. A fluid pressure responsive multiple-circuit system multiple-circuit valve apparatus, according to claim 2, wherein said multiple-circuit valve apparatus further comprises:
    (a) a third overflow valve positioned within said housing and having an inflow port connected to receive such operating fluid from said first passageway, said third overflow valve having a third minimum predetermined fluid pressure required on the inflow side to initially open thereby communicating fluid therethrough and a third predetermined closing fluid pressure on the outflow side thereby preventing reverse fluid communication therethrough after closing of said third overflow valve, said third closing pressure being less than said first and said second and said third minimum initial opening pressures;
    (b) a fourth fluid pressure communication passageway formed in said housing and connected at one end thereof to an outflow port of said third overflow valve, and having the other end thereof connectable to a second operating service brake circuit on such motor vehicle to communicate such operating fluid from said third overflow valve to such second operating service brake circuit; and
    (c) a second bidirectional flow communication means formed in said housing and connected at one end thereof to said fourth passageway and connected at the other end thereof to said third passageway for communicating fluid between said fourth and said third passageways, said second bidirectional flow communication means being restricted to limit such bidirectional flow to a predetermined level and to gradually reduce pressure in such parking brake circuit sufficient to activate such parking brake valve when a defect occurs in such second operating service brake circuit.

4. A fluid pressure responsive multiple-circuit system multiple-circuit valve apparatus, according to claim 3, wherein said second bidirectional flow communication means includes a second throttle valve disposed intermediate said ends thereof.

5. A fluid pressure responsive multiple-circuit system multiple-circuit valve apparatus, according to claim 4, wherein said multiple-circuit valve apparatus further comprises:
(a) a fourth overflow valve positioned within said housing and having an inflow port connected to receive such operating fluid from said first passageway, said fourth overflow valve having a fourth minimum predetermined pressure required on the inflow side to initially open thereby communicating fluid therethrough, and a fourth predetermined closing pressure on the outflow side thereby preventing reverse fluid communication therethrough after closing of said fourth overflow valve, said fourth closing pressure being less than said first and said second and said third and said fourth minimum initial opening pressures; and
(b) a fifth fluid pressure communication passageway formed in said housing and connected at one end thereof to an outflow port of said fourth overflow valve, and having the other end thereof connectable to an auxiliary service circuit on such motor vehicle to communicate such operating fluid from said fourth overflow valve to such auxiliary service circuit.

6. A multiple-circuit valve apparatus to control a fluid pressure responsive multiple-circuit system on a motor vehicle having a parking brake valve, said multiple-circuit valve apparatus comprising:
(a) a first fluid pressure communication passageway having one end thereof connectable to a source of operating fluid pressure;
(b) a first overflow valve having an inflow port connected to receive such operating fluid from said first passageway, said first overflow valve having a first minimum predetermined pressure required on the inflow side to initially open thereby communicating fluid therethrough and a first predetermined closing pressure on the outflow side thereby preventing reverse fluid communication therethrough after closing of said first overflow valve, said first predetermined closing pressure being less than said first minimum initial opening predetermined pressure;
(c) a second fluid pressure communication passageway connected at one end thereof to an outflow port of said first overflow valve and having the other end thereof connectable to an operating service brake circuit on such motor vehicle to communicate such operating fluid from said first overflow valve to such operating service brake circuit;
(d) a second overflow valve having an inflow port connected to receive such operating fluid from said first passageway, said second overflow valve having a second minimum predetermined pressure required on the inflow side to initially open thereby communicating fluid therethrough and a second predetermined closing pressure on the outflow side thereby preventing reverse fluid communication therethrough after closing of said second overflow valve, said second predetermined closing pressure being less than said first and said second minimum initial opening pressure;
(e) a third fluid pressure communication passageway connected at one end thereof to an outflow port of said second overflow valve and having the other end thereof connectable to such parking brake circuit on such motor vehicle to communicate such operating fluid from said second overflow valve to such parking brake circuit; and
(f) a first bidirectional flow communication means connected at one end thereof to said third passageway and connected at the other end thereof to said second passageway for communicating fluid between said third passageway and said second passageway, said first bidirectional flow communication means being restricted to limit such bidirectional flow to a predetermined level and to gradually reduce pressure in such parking brake circuit sufficient to activate such parking brake valve when a defect occurs in such operating service brake circuit.

7. A fluid pressure responsive multiple-circuit system multiple-circuit valve apparatus, according to claim 6, wherein said first bidirectional flow communication means includes a first throttle valve disposed intermediate said ends thereof.

8. A fluid pressure responsive multiple-circuit system multiple-circuit valve apparatus, according to claim 7, wherein said multiple-circuit valve apparatus further comprises:
(a) a third overflow valve having an inflow port connected to receive such operating fluid from said first passageway, said third overflow valve having a third minimum predetermined fluid pressure required on the inflow side to initially open thereby communicating fluid therethrough and a third predetermined closing fluid pressure on the outflow side thereby preventing reverse fluid communication therethrough after closing of said third overflow valve, said third closing pressure being less than said first and said second and said third minimum initial opening pressures;
(b) a fourth fluid pressure communication passageway connected at one end thereof to an outflow port of said third overflow valve, and having the other end thereof connectable to a second operating service brake circuit on such motor vehicle to communicate such operating fluid from said third overflow valve to such second operating service brake circuit; and
(c) a second bidirectional flow communication means connected at one end thereof to said fourth passageway and connected at the other end thereof to said third passageway for communicating fluid between said fourth and said third passageways, said second bidirectional flow communication means being restricted to limit such bidirectional flow to a predetermined level and gradually reduce pressure in such parking brake circuit sufficient to activate such parking brake valve when a defect occurs in such second operating service brake circuit.

9. A fluid pressure responsive multiple-circuit system multiple-circuit valve apparatus, according to claim 8, wherein said second bidirectional flow communication means includes a second throttle valve disposed intermediate said ends thereof.

10. A fluid pressure responsive multiple-circuit system multiple-circuit valve apparatus, according to claim 9, wherein said multiple-circuit valve apparatus further comprises:
  (a) a fourth overflow valve having an inflow port connected to receive such operating fluid from said first passageway, said fourth overflow valve having a fourth minimum predetermined pressure required on the inflow side to initially open thereby communicating fluid therethrough, and a fourth predetermined closing pressure on the outflow side thereby preventing reverse fluid communication therethrough after closing of said fourth overflow valve, said fourth closing pressure being less than said first and said second and said third and said fourth minimum initial opening pressures; and
  (b) a fifth fluid pressure communication passageway connected at one end thereof to an outflow port of said fourth overflow valve, and having the other end thereof connectable to an auxiliary service circuit on such motor vehicle to communicate such operating fluid from said fourth overflow valve to such auxiliary service circuit.

* * * * *